United States Patent
Huang et al.

(10) Patent No.: US 9,529,521 B2
(45) Date of Patent: Dec. 27, 2016

(54) GESTURE DETECTING APPARATUS AND METHOD FOR DETERMINING GESTURE ACCORDING TO VARIATION OF VELOCITY

(71) Applicants: Yu-Hao Huang, Hsin-Chu (TW); Ming-Tsan Kao, Hsin-Chu (TW); En-Feng Hsu, Hsin-Chu (TW); Meng-Huan Hsieh, Hsin-Chu (TW)

(72) Inventors: Yu-Hao Huang, Hsin-Chu (TW); Ming-Tsan Kao, Hsin-Chu (TW); En-Feng Hsu, Hsin-Chu (TW); Meng-Huan Hsieh, Hsin-Chu (TW)

(73) Assignee: PIXART IMAGING INCORPORATION, R.O.C., Hsinchu (TW)

( * ) Notice: Subject to any disclaimer, the term of this patent is extended or adjusted under 35 U.S.C. 154(b) by 42 days.

(21) Appl. No.: 13/907,277

(22) Filed: May 31, 2013

(65) Prior Publication Data
US 2013/0342443 A1 Dec. 26, 2013

(30) Foreign Application Priority Data
Jun. 20, 2012 (TW) .............................. 101121987 A

(51) Int. Cl.
| | | |
|---|---|---|
| *G06F 3/0488* | (2013.01) | |
| *G06F 3/01* | (2006.01) | |
| *G06F 3/03* | (2006.01) | |
| *G06F 3/0485* | (2013.01) | |

(52) U.S. Cl.
CPC .............. *G06F 3/0488* (2013.01); *G06F 3/017* (2013.01); *G06F 3/0304* (2013.01); *G06F 3/0485* (2013.01); *G06F 2203/04806* (2013.01)

(58) Field of Classification Search
CPC ...... G06F 3/017; G06F 3/0304; G06F 3/0488; G06F 3/0485; G06F 2203/04806
USPC .......................................................... 345/156
See application file for complete search history.

(56) References Cited

U.S. PATENT DOCUMENTS

| | | | |
|---|---|---|---|
| 9,268,409 B2* | 2/2016 | Huang | .................... G06F 3/017 |
| 2006/0010400 A1* | 1/2006 | Dehlin et al. | ................. 715/856 |
| 2009/0228841 A1* | 9/2009 | Hildreth | ........................ 715/863 |
| 2009/0315740 A1* | 12/2009 | Hildreth et al. | ................. 341/20 |
| 2010/0169824 A1* | 7/2010 | Sawai | .................... G06F 3/0346 715/784 |
| 2010/0281440 A1* | 11/2010 | Underkoffler et al. | ....... 715/863 |
| 2010/0295781 A1* | 11/2010 | Alameh | ................ G06F 3/0346 345/158 |

(Continued)

*Primary Examiner* — Christopher E Leiby
(74) *Attorney, Agent, or Firm* — Tung & Associates

(57) ABSTRACT

The present invention discloses a gesture detecting apparatus which includes an image capturing device and a processing unit. The image capturing device is for capturing an object light beam reflected by an object and outputting corresponding image information accordingly. The processing unit is for processing the image information and generating a first command or a second command accordingly. The steps of generating the first command and the second command by the processing unit include: outputting a first command if an image size of the image information increases with a relatively higher velocity and decreases with a relatively lower velocity in a sequential time series; and outputting a second command if the image size of the image information increases with a relatively lower velocity and decreases with a relatively higher velocity in the sequential time series.

18 Claims, 5 Drawing Sheets

(56) References Cited

U.S. PATENT DOCUMENTS

| | | | |
|---|---|---|---|
| 2011/0025598 A1* | 2/2011 | Underkoffler et al. | 345/156 |
| 2012/0240042 A1* | 9/2012 | Migos | G06F 3/017 715/702 |
| 2013/0222246 A1* | 8/2013 | Booms et al. | 345/168 |
| 2013/0293454 A1* | 11/2013 | Jeon | G06F 3/017 345/156 |

* cited by examiner

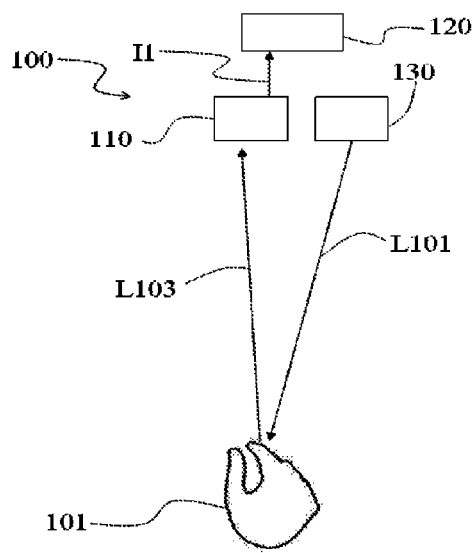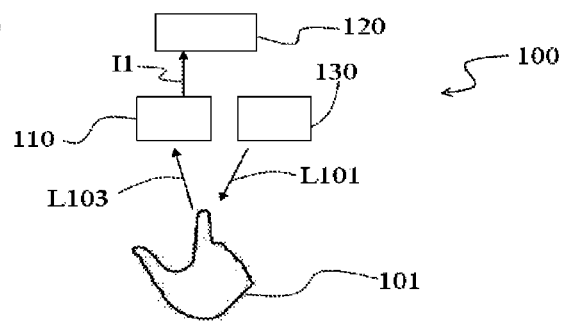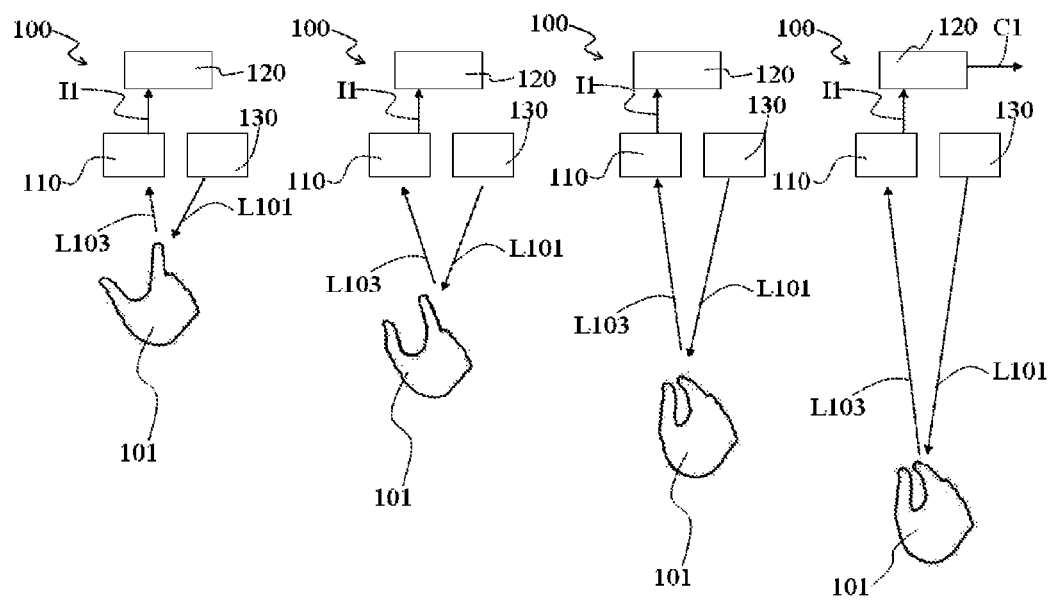
Fig. 1A  Fig. 1B
Fig. 1C  Fig. 1D  Fig. 1E  Fig. 1F

GESTURE DETECTING APPARATUS AND METHOD FOR DETERMINING GESTURE ACCORDING TO VARIATION OF VELOCITY

CROSS REFERENCE

The present invention claims priority to TW 101121987, filed on Jun. 20, 2012.

BACKGROUND OF THE INVENTION

Field of Invention

The present invention relates to a method for determining a gesture and a gesture detecting apparatus; particularly, it relates to such method and apparatus for determining a gesture according to a variation of a velocity.

Description of Related Art

Generally, for a touch panel, if a user desires to repeatedly expand (zoom-in) the size of the information presented on a displayed page, he or she simply contacts the touch surface with the thumb and the forefinger and repeats an action to expand the distance between the thumb and the forefinger (i.e., the pinch-out action). While repeating the pinch-out action, the user needs to close the thumb and the forefinger back to start a next pinch-out action. Because only the pinch-out action touches the touch surface while the closing action does not touch the touch surface, the repeated pinch-out actions will not be misjudged for a touch panel.

Nevertheless, if the same function is to be performed by optically detecting a gesture of the user by an image sensor, the gesture is likely to be misinterpreted. That is, the image sensor will output a command (e.g., a zoom-in command) in response to a pinch-out gesture (e.g., separating the thumb and the forefinger apart from each other), but when the user closes his or her fingers in order to perform a next pinch-out gesture, the image sensor will also output another command (e.g., a zoom-out command), which is undesirable.

SUMMARY OF THE INVENTION

An objective of the present invention is to provide a method and a gesture detecting apparatus for determining a gesture according to a variation of a velocity, which are capable of detecting the gesture with better accuracy and less misjudgment.

Other objectives and advantages of the present invention can be understood from the disclosure of the specification.

To achieve one or more of the above and other objectives, from one perspective, the present invention provides a method for determining a gesture according to a variation of a velocity, comprising: determining whether an image size of an object image increases with a first relatively higher velocity and decreases with a relatively first lower velocity in a sequential time series, and outputting a first command when it is determined yes. The method preferably further comprises steps of: determining whether an image size of an object image increases with a second relatively lower velocity and decreases with a second relatively higher velocity in a sequential time series, and outputting a second command when it is determined yes.

From another perspective, the present invention provides a method for determining a gesture according to a variation of a velocity, comprising: determining whether an image brightness of an object image increases with a first relatively higher velocity and decreases with a first relatively lower velocity in a sequential time series, and outputting a first command when it is determined yes. The method preferably further comprises steps of: determining whether an image brightness of an object image increases with a second relatively lower velocity and decreases with a second relatively higher velocity in a sequential time series, and outputting a second command when it is determined yes.

In one embodiment, the above-mentioned first command is a zoom-in command.

In one embodiment, the above-mentioned second command is a zoom-out command.

From yet another perspective, the present invention provides a method for determining a gesture according to a variation of a velocity, comprising: determining whether an object image moves along a first direction with a relatively higher velocity and subsequently moves along a second direction opposite to the first direction with a relatively lower velocity in a sequential time series, and outputting a command when it is determined yes.

In one embodiment, the above-mentioned object image is an image of a hand or a part of a hand.

In one embodiment, the above-mentioned command is a command of moving toward the first direction.

In one embodiment, the above-mentioned gesture is a repeating gesture.

In one embodiment, the first relatively higher velocity and the first relatively lower velocity are relative to each other, and the second relatively higher velocity and the second relatively lower velocity are relative to each other.

From still another perspective, the present invention provides a gesture detecting apparatus which comprises an image capturing device and a processing unit. The image capturing device is for capturing an object light beam reflected by an object and outputting corresponding image information. The processing unit is for processing the image information and generating a first command or a second command accordingly. The processing unit performs the following steps for generating the first command and the second command, the steps comprising: determining whether decreases with a relatively first lower velocity in a sequential time series, and outputting a first command when it is determined yes; and determining whether an image size of an object image increases with a second relatively lower velocity and decreases with a second relatively higher velocity in a sequential time series, and outputting a second command when it is determined yes.

In one embodiment, the gesture detecting apparatus further comprises a light emitting unit for providing a light beam, wherein the light beam is reflected by the object to become the object light beam.

In view of the above, the present invention has at least the following features and advantages: The present invention distinguishes a commanding gesture from a restoration/preparatory action by their different velocities, so that the present invention can judge that the user's actual intention is to input one single command and avoid the misjudgment. For example, the present invention can output a command if the image size (or the image brightness) of the image information increases with a relatively higher velocity and subsequently decreases with a relatively lower velocity in a sequential time series, hence avoiding the misjudgment. For another example, the present invention can output a command if the image size (or the image brightness) of the image information increases with a relatively lower velocity and subsequently decreases with a relatively lower velocity in a sequential time series, thus also avoiding the misjudgment.

The objectives, technical details, features, and effects of the present invention will be better understood with regard to the detailed description of the embodiments below, with reference to the attached drawings.

BRIEF DESCRIPTION OF THE DRAWINGS

FIGS. 1A-1F illustrate that a gesture is determined by the gesture detecting apparatus in a sequential time series according to an embodiment of the present invention.

DESCRIPTION OF THE PREFERRED EMBODIMENTS

Figure 2:
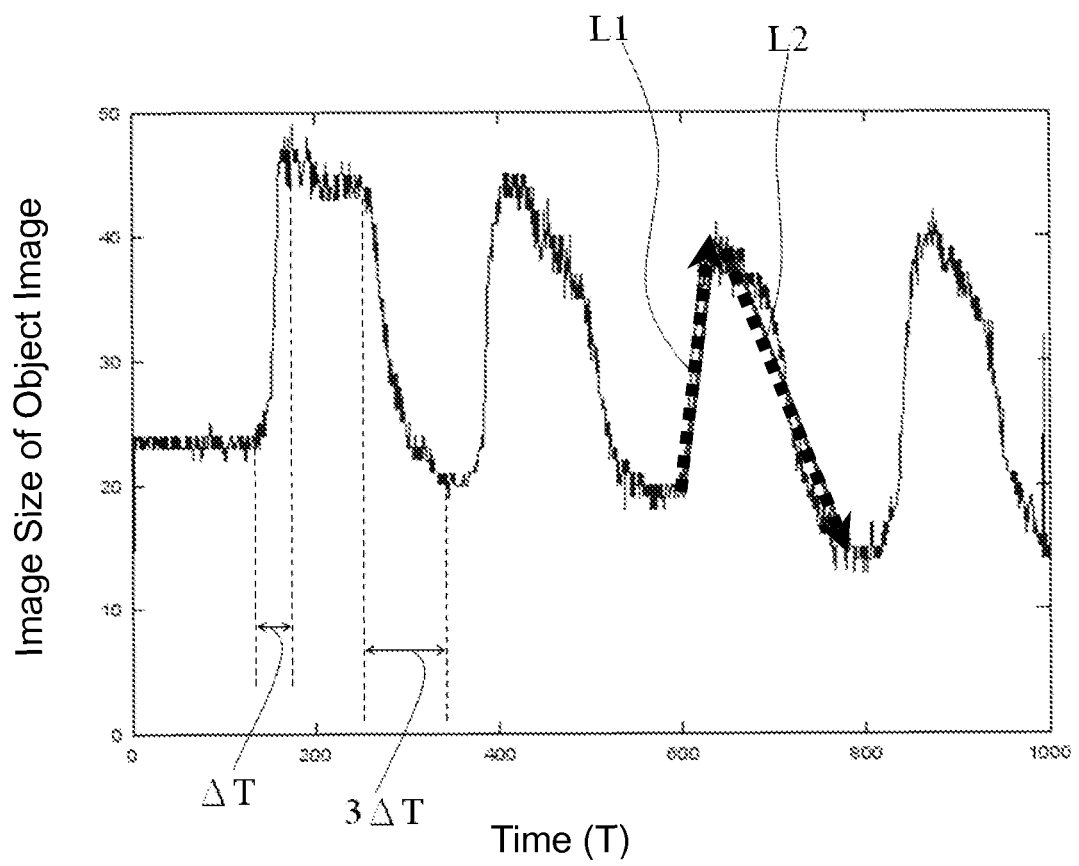
FIG. 2 shows the correlation between the image size of the object image and the time, wherein the object image is generated according to the gestures of FIGS. 1A-1F.

The above and other technical details, features and effects of the present invention will be will be better understood with regard to the detailed description of the embodiments below, with reference to the drawings. In the description, the words relate to directions such as "on", "below", "left", "right", "forward", "backward", etc. are used to illustrate relative orientations in the drawings and should not be considered as limiting in any way.

FIGS. 1A-1F illustrate that a gesture is determined by the gesture detecting apparatus in a sequential time series according to an embodiment of the present invention. FIG. 2 shows the correlation between the image size of the object image and the time, wherein the object image is generated according to the gestures of FIGS. 1A-1F. Please refer to FIGS. 1A-1F. The gesture detecting apparatus 100 of this embodiment comprises an image capturing device 110 and a processing unit 120. The image capturing device 110 is for capturing an object light beam L103 reflected by an object 101 and outputting corresponding image information I1. The processing unit 120 is for processing the image information I1 and generating a first command C1 or a second command C2 accordingly. In this embodiment, the gesture detecting apparatus 100 further comprises a light emitting unit 130 for providing a light beam L101. The light beam L101 is reflected by the object 101 to become the object light beam L103. The light emitting unit 130 can be an invisible light emitting unit or a visible light emitting unit. The light beam L101 of this embodiment is for example but limited to an infrared light beam. The object 101 is for example a hand or a part of a hand.

The gesture detecting apparatus 100 of this embodiment determines the gesture according to the velocity variation of the user's habitual gesture motions, thereby reducing the likelihood to misjudge the gesture. The determination of a gesture by the gesture detecting apparatus 100 in a sequential time series will be described in more detail below with reference to FIGS. 1A-1F, which show the statuses of the gesture during a sequential time series of ΔT-interval.

Please refer to FIGS. 1A-1B. The user can approach toward the image capturing device 110 by two fingers (e.g., the thumb and the forefinger) with a rapid velocity and expand the distance between the thumb and the forefinger (i.e., a pinch-out gesture separating the thumb and the forefinger apart from each other), indicating a command such as a zoom-in command. Thus, the image size of the object image increases with a rapid velocity during the time interval of ΔT, as shown by the successive statuses of FIGS. 1A-1B and the slope L1 of FIG. 2. More specifically, when the user desires to input a command (e.g., a zoom-in command) to the gesture detecting apparatus 100 by a gesture moving along a direction (e.g., in the direction of approaching toward the image capturing device 110), the gesture tends to move along this direction with a rapid velocity. Besides, because the gesture from FIG. 1A to FIG. 1B is to separate the thumb and the forefinger apart from each other, this also causes the object image detected by the image capturing device 110 to increase in size. In view of the above, the image size of the object image detected by the image capturing device 110 increases with a rapid velocity during a sequential time series.

On the other hand, if the user intends to repeat the gesture from FIG. 1A to FIG. 1B, unavoidably, the user has to restore the gesture to its initial configuration (as shown by the successive statuses of FIGS. 1C-1F) and thereafter to repeat the gesture from FIG. 1A to FIG. 1B. Notably, it generally takes longer to restore the gesture to its initial configuration, so when the user restores the gesture to its initial configuration, the image size of the object image detected by the image capturing device 110 decreases with a slow velocity during the time interval of of 3ΔT, as shown by the successive statuses of FIGS. 1C-1F and the slope L2 of FIG. 2. In this embodiment, the rapid velocity and the slow velocity are relatively defined with respect to each other, as shown by the successive statuses of FIGS. 1A-1F and the slopes L1 and L2 of FIG. 2.

More specifically, when the user desires to restore the gesture to its initial configuration, the gesture tends to move along its direction with a slow velocity, as shown by the successive statuses of FIGS. 1C-1F. In addition, because the action shown in FIGS. 1C-1F is to close the thumb and the forefinger to each other, the object image detected by the image capturing device 110 will gradually decrease in size. In view of the above, the image size of the object image detected by the image capturing device 110 is shrunk with a slow velocity during a sequential time series. As such, the processing unit 120 can output a first command C1 if the image size of the image information I1 increases with a relatively higher velocity and subsequently decreases with a relatively lower velocity in a sequential time series, wherein the first command C1 may be, for example, a zoom-in command. If the user repeats the gesture shown by FIGS. 1A-1F, the processing unit 120 will repeatedly output the first command C1, that is, the zoom-in command will be repeatedly outputted.

Notably, the gesture detecting apparatus 100 of this embodiment can distinguish a commanding gesture (e.g., the pinch-out gesture) from a restoration action (e.g., the closing action) by different velocities, so the gesture detecting apparatus 100 will not treat the commanding gesture and the restoration action as two different commands and output both of them, thereby reducing the likelihood of misjudgment. In prior art, if the user performs the gesture as shown in FIGS. 1A-1F, two different commands instead of one single command will be outputted, while the user actually desires to input only one single command. In other words, the gesture detecting apparatus 100 of this embodiment can recognize the user's actual intention of one single command by distinguishing the commanding gesture from the restoration action according to different velocities. And when the gesture detecting apparatus 100 of this embodiment detects repeating gestures of the one shown in FIGS. 1A-1F, it will repeatedly output the first command C1 (that is, the zoom-in command will be repeatedly outputted) without any misjudgment.

FIGS. 3A-3F illustrate another embodiment of the present invention wherein another gesture is determined by the gesture detecting apparatus in a sequential time series. FIG. 4 shows the correlation between the image size of the object image and the time, wherein the object image is generated according to the statuses of the gesture of FIGS. 3A-3F. FIGS. 3A-3F show that the user can input a command by closing two fingers (e.g., the thumb and the forefinger) toward each other (i.e., a pinch-in gesture) and moving the thumb and the forefinger away from the image capturing device 110 by a rapid velocity. In this embodiment, the statuses of the gesture shown in FIGS. 3A-3F are performed during a sequential time series of $\Delta T$-interval.

Please refer to FIGS. 3A-3D. The user approaches toward the image capturing device 110 by two fingers (e.g., the thumb and the forefinger) with a slow velocity and expands the distance between the thumb and the forefinger (i.e., separating two fingers apart from each other), in order to prepare for the subsequent pinch-in gesture (closing the thumb and the forefinger to each other) with a rapid velocity. Under such circumstance, the image size of the object image increases with a slow velocity during a time interval of $3\Delta T$, as shown in the successive statuses of FIGS. 3A-3D and the slope L3 of FIG. 4. Likewise, it takes longer to perform the preparatory action than to perform the subsequent pinch-in gesture, so when the user desires to perform the preparatory action, this preparatory action tends to move along its direction with a slow velocity, as shown by the successive statuses of FIGS. 3A-3D. In addition, because the preparatory action as shown by FIGS. 3A-3D is to separate the thumb and the forefinger apart from each other, the object image detected by the image capturing device 110 will gradually increase in size.

Figures 3A, 3B, 3C, 3D:
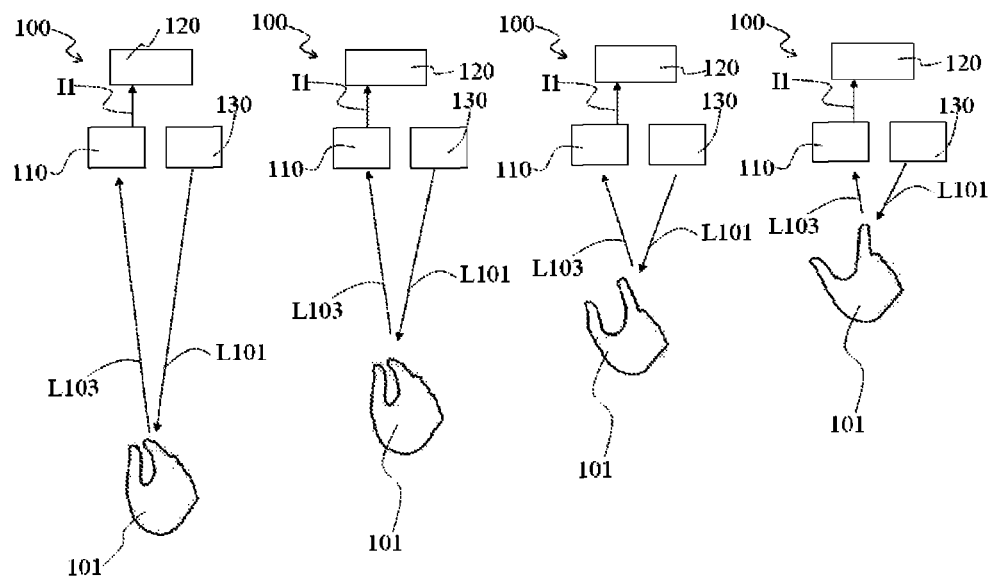
FIGS. 3A-3F illustrate that a gesture is determined by the gesture detecting apparatus in a sequential time series according to another embodiment of the present invention.
Figures 3E, 3F:
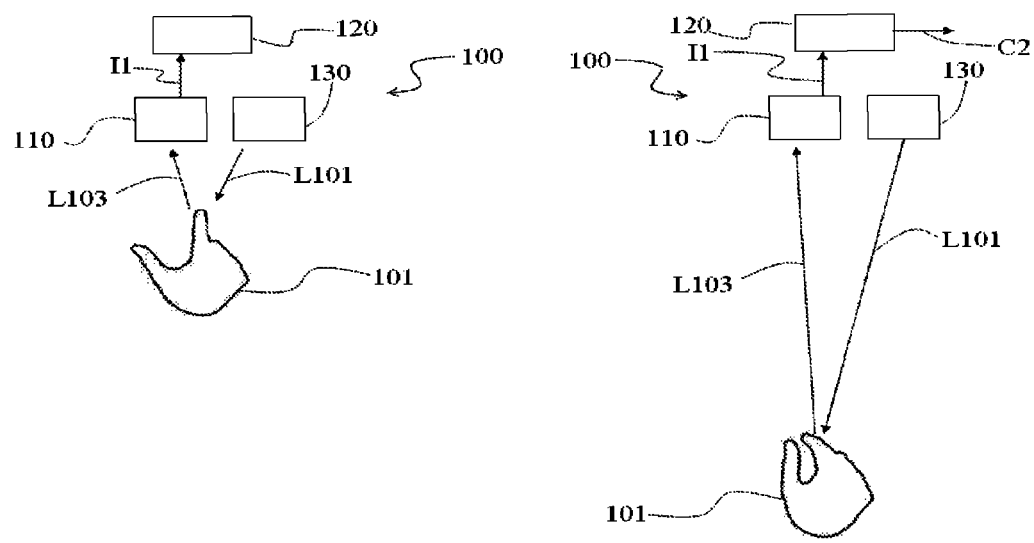
Figure 4:
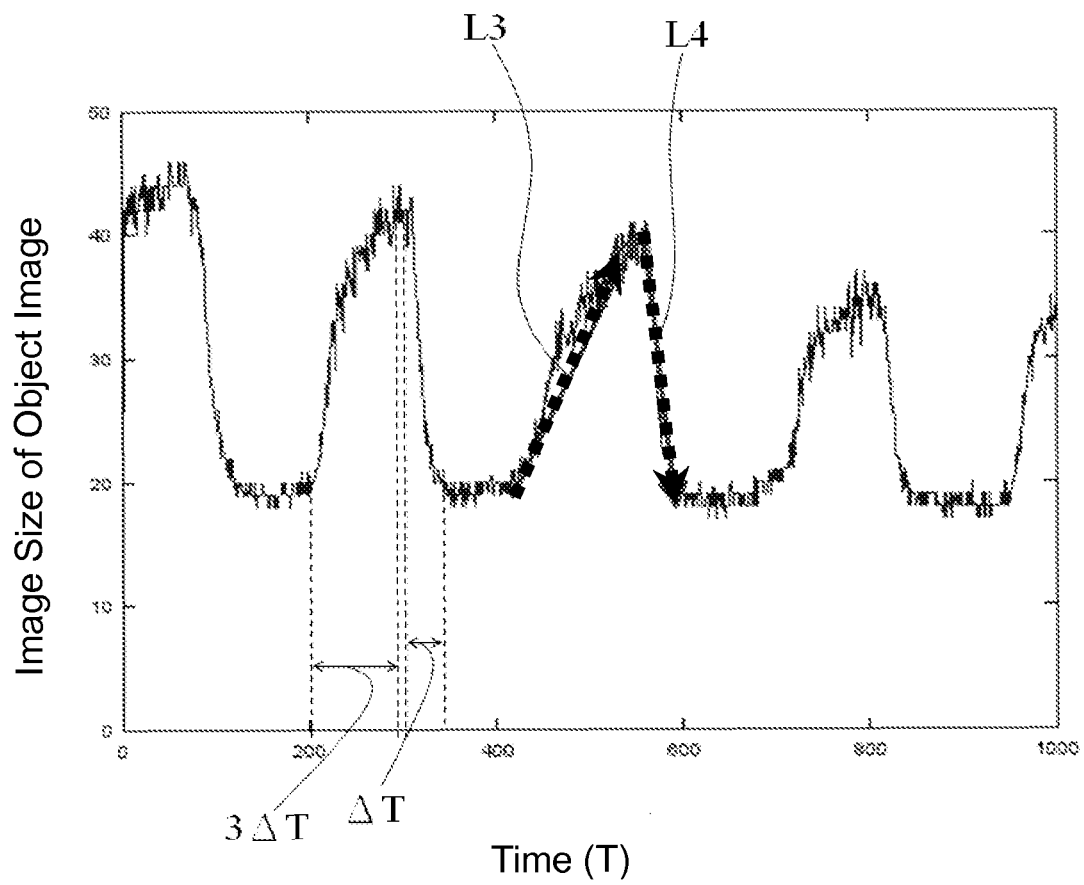
FIG. 4 shows the correlation between the image size of the object image and the time, wherein the object image is generated according to the gestures of FIGS. 3A-3F.

Please refer to FIGS. 3E-3F now. The user can input a command by closing the thumb and the forefinger (i.e., a pinch-in gesture) and moving away from the image capturing device 110 with a rapid velocity; the command for example is a zoom-out command. As a result, the image size of the object image decreases with a rapid velocity during a time interval of $\Delta T$, as shown by the successive statuses of FIGS. 3E-3F and the slope L4 of FIG. 4. Similarly, when the user desires to input a command such as a zoom-out command to the gesture detecting apparatus 100 by a gesture moving along a direction (e.g., in the direction away from the image capturing device 110) with a rapid velocity, the gesture tends to move along this direction with a rapid velocity. Besides, because the gesture shown by FIGS. 3E-3F is to close the thumb and the forefinger close to each other, the object image detected by the image capturing device 110 will decrease in size with a rapid velocity. In view of the above, the image size of the object image detected by the image capturing device 110 decreases with a rapid velocity during a time interval of $\Delta T$. In this embodiment, the rapid velocity and the slow velocity are defined relatively with respect to each other, as shown by the successive statuses of FIGS. 3A-3F and the slopes L3 and L4 of FIG. 4.

According to FIGS. 3A-3F and FIG. 4, the processing unit 120 can output a second command C2 if the image size of the image information I1 decreases with a slow velocity and subsequently increases with a rapid velocity in a sequential time series, wherein the second command C2 maybe, for example, a zoom-out command. If the user repeats the gesture in FIGS. 3A-3F, the processing unit 120 will repeatedly output the second command C2, that is, the zoom-out command will be repeatedly outputted.

Likewise, the gesture detecting apparatus 100 of this embodiment can distinguish a commanding gesture (e.g., the pinch-in gesture) from a preparatory action (e.g., the closing action) by different velocities, so the gesture detecting apparatus 100 will not treat the commanding gesture and the preparatory action as two different commands and output both of them, thereby reducing the likelihood of misjudgment. In prior art, if the user performs the gesture as shown in FIGS. 3A-3F, two different commands instead of one single command will be outputted, while the user actually desires to input only one single command. In other words, the gesture detecting apparatus 100 of this embodiment can recognize the user's actual intention of one single command by distinguishing the commanding gesture from the preparatory action according to different velocities. And when the gesture detecting apparatus 100 of this embodiment detects repeating gestures of the one shown in FIGS. 3A-3F, it will repeatedly output the second command C2 (that is, the zoom-in command will be repeatedly outputted) without any misjudgment. Note that the preparatory action in FIGS. 3A-3D may be performed after the commanding gesture in FIGS. 3E-3F, and the restoration action in FIGS. 1C-1F may be performed before the commanding gesture in FIGS. 1A-1B, so the preparatory action and the restoration action can be deemed equivalent to each other. In addition, the judgments described in the above embodiments are based on the size of the object image, which is only one embodiment in the scope of the present invention. In another embodiment, because the image brightness of the object image is also associated with the distance between the object 101 and the image capturing device 110, it is also practicable to use such information for the judgments.

FIGS. 5A-5F illustrate another embodiment of the present invention wherein another gesture is determined by the gesture detecting apparatus in a sequential time series. As shown in FIGS. 5A-5F, the user inputs a command by moving fingers along a direction with a rapid velocity, wherein such movement is a translational movement of fingers from one side to another side. In this embodiment, the statuses of gesture shown in FIGS. 5A-5F are performed during a sequential time series of $\Delta T$-interval.

Please refer to FIGS. 5A-5D. The user inputs a command (e.g., a move-right command) by moving the fingers along a direction with a rapid velocity. Under such circumstance, the object image moves rapidly in a time interval of $\Delta T$, as shown in the successive statuses from FIG. 5A to FIG. 5B. Specifically, when the user desires to input a command (e.g., a move-right command) into the gesture detecting apparatus 100 by a gesture moving along a direction (e.g., moving toward the right side), the gesture tends to move along this direction with a rapid velocity. Accordingly, the object image detected by the image capturing device 110 moves with a rapid velocity in a time interval of $\Delta T$-interval.

Figure 5C:
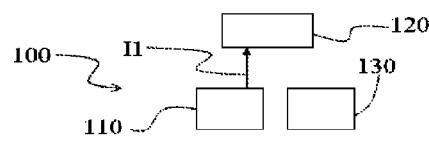
FIGS. 5A-5F illustrate that a gesture is determined by the gesture detecting apparatus in a sequential time series according to yet another embodiment of the present invention.
Figure 5A:
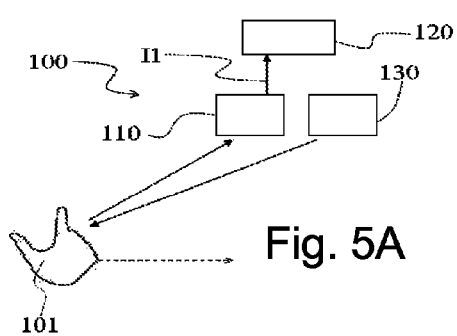
Figure 5D:
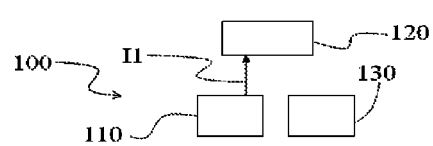
Figure 5B:
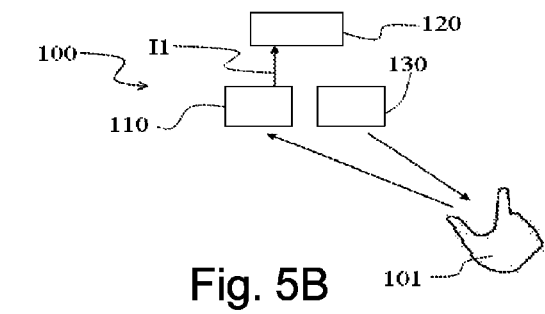
Figure 5E:
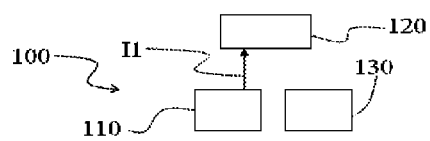
Figure 5F:
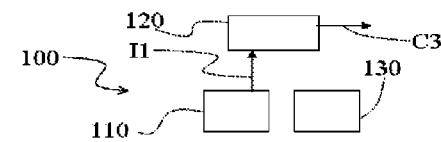
Figure 5F:
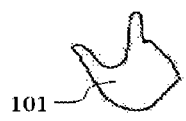

On the other hand, if the user desires to repeats the gesture shown in FIGS. 5A-5B, unavoidably, the user has to restore the gesture to its initial position (as shown by the successive statuses of FIGS. 5C-5F) to prepare for the next commanding gesture (e.g., the move-right gesture shown in FIGS. 5A-5B). Notably, it takes longer to restore the gesture to its initial position, so when the user restores the gesture to its initial position, the object image detected by the image capturing device 110 correspondingly moves with a slow velocity during a time interval of $3\Delta T$, as shown in the successive statuses of FIGS. 5C-5F. In this embodiment, the rapid velocity and the slow velocity are relatively defined with respect to each other, as shown by the successive statuses of FIGS. 5A-5F.

As such, the processing unit 120 can output a third command C3 if the object image of the image information I1 moves along a first direction with a rapid velocity and subsequently moves along a second direction opposite to the first direction with a slow velocity in a sequential time series, wherein the third command C3 can be, for example, a move-right command. If the user repeats the gesture as shown in FIGS. 5A-5F, the processing unit 120 will repeatedly output the third command C3, that is, the move-right command will be repeatedly outputted.

Likewise, the gesture detecting apparatus 100 of this embodiment can distinguish a commanding gesture (e.g., the move-right gesture) from a restoration action (e.g., the move-left action) by different velocities, so the gesture detecting apparatus 100 will not treat the commanding gesture and the restoration action as two different commands and output both of them, thereby reducing the likelihood of misjudgment. In prior art, if the user performs the gesture as shown in FIGS. 1A-1F, two different commands instead of one single command will be outputted, while the user actually desires to input only one single command. In other words, the gesture detecting apparatus 100 of this embodiment can recognize the user's actual intention of one single command by distinguishing the commanding gesture from the restoration action according to different velocities. And when the gesture detecting apparatus 100 of this embodiment detects repeating gestures of the one shown in FIGS. 5A-5F, it will repeatedly output the third command C3 (that is, the move-right command will be repeatedly outputted) without any misjudgment.

It is noteworthy that the present invention determines the gesture according to the variation of the relative velocity, wherein the relative velocity includes a component of "relative displacement" and a component of "time".

In view of the above, the present invention has at least the following features and advantages: The present invention distinguishes a commanding gesture from a restoration/preparatory action by their different velocities, so that the present invention can judge that the user's actual intention is to input one single command and avoid the misjudgment. For example, the present invention can output a command if the image size (or the image brightness) of the image information increases with a relatively higher velocity and subsequently decreases with a relatively lower velocity in a sequential time series, hence avoiding the misjudgment. For another example, the present invention can output a command if the image size (or the image brightness) of the image information increases with a relatively lower velocity and subsequently decreases with a relatively lower velocity in a sequential time series, thus also avoiding the misjudgment.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. In view of the foregoing, the spirit of the present invention should cover all such and other modifications and variations, which should be interpreted to fall within the scope of the following claims and their equivalents.

What is claimed is:

1. A method for determining a gesture according to a variation of a velocity, comprising:
   when the gesture includes a first action which starts from an initial position and a second action which ends nearby the initial position, detecting whether the gesture causes an image size of an object image to increase and decrease, wherein the increase of the image size corresponds to a first command and the decrease of the image size corresponds to a second command;
   determining whether the second action takes a longer time than the first action or the first action takes a longer time than the second action, so as to decide which one of the first action and the second action is a commanding gesture and which one of the first action and the second action is a restoration action; and
   outputting only one of the first command and the second command, which corresponds to the commanding gesture.

2. The method of claim 1, further comprising:
   determining whether the image size of the object image increases with a first relatively higher velocity and decreases with a first relatively lower velocity in a sequential time series, and when the image size of the object image increases with the first relatively higher velocity and decreases with the first relatively lower velocity in the sequential time series is determined yes, outputting the first command but ignoring the second command; and
   determining whether the image size of the object image increases with a second relatively lower velocity and decreases with a second relatively higher velocity in a sequential time series, and when the image size of the object image increases with the second relatively lower velocity and decreases with the second relatively higher velocity in the sequential time series is determined yes, outputting the second command but ignoring the first command.

3. The method of claim 1, wherein the object image is an image of a hand or a part of a hand.

4. The method of claim 1, wherein the first command is a zoom-in command.

5. The method of claim 1, wherein the second command is a zoom-out command.

6. The method of claim 1, wherein the gesture is a repeating gesture.

7. The method of claim 1, wherein the sequential time series includes a sequential pinching motion time series for a pinching motion between at least two fingers, the sequential pinching motion time series including a first time interval and a second time interval, the increase of the image size being performed during the first time interval, the decrease of the image size being performed during the second time interval, and the first time interval being shorter than the second time interval.

8. A method for determining a gesture according to a variation of a velocity, comprising:
   when the gesture includes a first action which starts from an initial position and a second action which ends nearby the initial position detecting whether the gesture causes an image brightness of an object image to increase and decrease, wherein the increase of the image brightness corresponds to a first command and the decrease of the image brightness corresponds to a second command;

determining whether the second action takes a longer time than the first action or the first action takes a longer time than the second action, so as to decide which one of the first action and the second action is a commanding gesture and which one of the first action and the second action is a restoration action; and outputting only one of the first command and the second command, which corresponds to the commanding gesture.

9. The method of claim 8, further comprising:

determining whether the image brightness of the object image increases with a first relatively higher velocity and decreases with a first relatively lower velocity in a sequential time series, and when the image brightness of the object image increases with the first relatively higher velocity and decreases with the first relatively lower velocity in the sequential time series is determined yes, outputting the first command but ignoring the second command; and determining whether the image brightness of the object image increases with a second relatively lower velocity and decreases with a second relatively higher velocity in a sequential time series, and when the image brightness of the object image increases with the second relatively lower velocity and decreases with the second relatively higher velocity in the sequential time series is determined yes, outputting the second command but ignoring the first command.

10. The method of claim 8, wherein the object image is an image of a hand or a part of a hand.

11. The method of claim 8, wherein the first command is a zoom-in command.

12. The method of claim 8, wherein the second command is a zoom-out command.

13. The method of claim 8, wherein the gesture is a repeating gesture.

14. The method of claim 8, wherein the sequential time series includes a sequential pinching motion time series for a pinching motion between at least two fingers, the sequential pinching motion time series including a first time interval and a second time interval, the increase of the image brightness being performed during the first time interval, the decrease of the image brightness being performed during the second time interval, and the first time interval being shorter than the second time interval.

15. A method for determining a gesture according to a variation of a velocity, comprising:

when the gesture includes a first action which starts from an initial position and a second action which ends nearby the initial position, the first and second actions causing movements of an object image, wherein one of the movements corresponds to a first command and the other of the movements corresponds to a second command, determining whether the second action takes a longer time than the first action or the first action takes a longer time than the second action, so as to decide which one of the first action and the second action is a commanding gesture and which one of the first action and the second action is a restoration action; and outputting only one of the first command and the second command, which corresponds to the commanding gesture.

16. The method of claim 15, wherein the first action includes separating at least two fingers and the second action includes closing the at least two fingers, or the first action includes closing at least two fingers and the second action includes separating the at least two fingers.

17. A gesture detecting apparatus, wherein the gesture includes a first action which starts from an initial position, and a second action which ends nearby the initial position and wherein the first action causes an image size of an object image to increase or decrease, wherein the increase of the image size corresponds to a first command and the decrease of the image size corresponds to a second command; the gesture detecting apparatus comprising:

an image capturing device for capturing an object light beam reflected by an object and outputting corresponding image information;

a processing unit for processing the image information and generating a first command or a second command accordingly, wherein the processing unit generates the first command or the second command by steps comprising:

determining whether the second action takes a longer time than the first action or the first action takes a longer time than the second action, so as to decide which one of the first action and the second action is a commanding gesture and which one of the first action and the second action is a restoration action; and generating only one of the first command and the second command, which corresponds to the commanding gesture.

18. The gesture detecting apparatus of claim 17, wherein the processing unit generates the first command or the second command by steps further comprising:

determining whether the image size of the object image increases with a first relatively higher velocity and decreases with a first relatively lower velocity in a sequential time series, and when the image size of the object image increases with the first relatively higher velocity and decreases with the first relatively lower velocity in the sequential time series is determined yes, outputting the first command but ignoring the second command; and determining whether the image size of the object image increases with a second relatively lower velocity and decreases with a second relatively higher velocity in a sequential time series, and when the image size of the object image increases with the second relatively lower velocity and decreases with the second relatively higher velocity in the sequential time series is determined yes, outputting the second command but ignoring the first command.

* * * * *